United States Patent
Qu et al.

(10) Patent No.: US 10,777,192 B2
(45) Date of Patent: Sep. 15, 2020

(54) METHOD AND APPARATUS OF RECOGNIZING FIELD OF SEMANTIC PARSING INFORMATION, DEVICE AND READABLE MEDIUM

(71) Applicant: BAIDU ONLINE NETWORK TECHNOLOGY (BEIJING) CO., LTD., Beijing (CN)

(72) Inventors: Qin Qu, Beijing (CN); Zejin Hu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 93 days.

(21) Appl. No.: 15/980,233

(22) Filed: May 15, 2018

(65) Prior Publication Data

US 2018/0342241 A1  Nov. 29, 2018

(30) Foreign Application Priority Data

May 25, 2017 (CN) .................. 2017 1 03795771

(51) Int. Cl.
*G10L 15/18* (2013.01)
*G10L 15/22* (2006.01)
(Continued)

(52) U.S. Cl.
CPC ........ *G10L 15/1822* (2013.01); *G06F 40/186* (2020.01); *G06F 40/205* (2020.01);
(Continued)

(58) Field of Classification Search
CPC ... G10L 15/18; G10L 15/1815; G10L 15/182; G10L 15/183; G10L 15/19; G10L 15/197;
(Continued)

(56) References Cited

U.S. PATENT DOCUMENTS 6,839,669 B1 * 1/2005 Gould ................. G10L 15/22
  704/246
7,231,343 B1 * 6/2007 Treadgold ............ G06F 40/247
  704/9
(Continued)

FOREIGN PATENT DOCUMENTS

CN  102081627 A  6/2011
CN  103678356 A  3/2014
(Continued)

OTHER PUBLICATIONS

Chinese Search Report dated Mar. 25, 2020 for related Chinese Appln. No. 201710379577.1; 3 Pages.

*Primary Examiner* — James S Wozniak
(74) *Attorney, Agent, or Firm* — Brooks Kushman PC (57) ABSTRACT

A method and apparatus of recognizing a field of semantic parsing information, a device and a readable medium. The method includes: obtaining at least one preset keyword extracting pattern which is in a preset field and used to parse user-input speech data to generate semantic parsing information, each of the at least one preset keyword extracting pattern; obtaining subject weights of keywords according to importance degree identifiers of the keywords in the preset keyword extracting patterns; calculating a subject score of the speech parsing information according to the subject weights of the keywords; recognizing whether the speech parsing information belongs to the preset field according to the subject score of the speech parsing information. The method recognizes the field to which the speech parsing information belongs to ensure correctness of the recognized field, and thereby ensure correctness of operations performed by the App according to the semantic parsing information.

12 Claims, 3 Drawing Sheets

(51) Int. Cl.
    *G10L 15/26*     (2006.01)
    *G06F 40/30*     (2020.01)
    *G06F 40/186*    (2020.01)
    *G10L 15/10*     (2006.01)
    *G10L 15/08*     (2006.01)
    *G10L 15/183*    (2013.01)
    *G06F 40/174*    (2020.01)
    *G06F 40/205*    (2020.01)

(52) U.S. Cl.
    CPC .............. *G06F 40/30* (2020.01); *G10L 15/10* (2013.01); *G10L 15/1815* (2013.01); *G10L 15/22* (2013.01); *G10L 15/26* (2013.01); *G06F 40/174* (2020.01); *G10L 15/183* (2013.01); *G10L 2015/088* (2013.01); *G10L 2015/223* (2013.01)

(58) Field of Classification Search
    CPC .............. G10L 2015/223; G10L 15/10; G10L 15/1822; G06F 17/243; G06F 40/186; G06F 40/174; G06F 40/30
    USPC ......... 704/235, 257, 270, 275; 715/224, 226
    See application file for complete search history.

(56) References Cited

U.S. PATENT DOCUMENTS

| | | | | |
|---|---|---|---|---|
| 8,452,594 | B2* | 5/2013 | Oz | G10L 15/26 704/235 |
| 8,868,409 | B1* | 10/2014 | Mengibar | G10L 15/26 704/10 |
| 9,324,323 | B1* | 4/2016 | Bikel | G10L 15/183 |
| 2002/0087309 | A1* | 7/2002 | Lee | G06Q 30/06 704/240 |
| 2004/0015365 | A1* | 1/2004 | Ohmori | G10L 15/22 704/276 |
| 2004/0024739 | A1* | 2/2004 | Copperman | G06F 16/353 |
| 2005/0080632 | A1* | 4/2005 | Endo | G10L 15/08 704/277 |
| 2005/0222837 | A1* | 10/2005 | Deane | G06F 17/277 704/4 |
| 2006/0035632 | A1* | 2/2006 | Sorvari | H04M 1/72547 455/418 |
| 2008/0109429 | A1* | 5/2008 | Petrin | G06F 16/335 |
| 2008/0243502 | A1* | 10/2008 | Ativanichayaphong | G10L 15/193 704/240 |
| 2008/0275699 | A1* | 11/2008 | Mozer | 704/231 |
| 2008/0319750 | A1* | 12/2008 | Potter | G10L 15/26 704/255 |
| 2009/0030689 | A1* | 1/2009 | Perrin | G10L 15/065 704/246 |
| 2010/0094618 | A1* | 4/2010 | Zimmerman | G06Q 50/22 704/9 |
| 2010/0100377 | A1* | 4/2010 | Madhavapeddi | G10L 15/22 704/235 |
| 2013/0318426 | A1* | 11/2013 | Shu | G06F 17/243 715/226 |
| 2014/0012579 | A1* | 1/2014 | Ganong, III | G10L 15/01 704/257 |
| 2014/0044357 | A1* | 2/2014 | Moorthy | G06K 9/00463 382/188 |
| 2014/0136970 | A1* | 5/2014 | Xiao | G06F 17/24 715/271 |
| 2014/0358539 | A1* | 12/2014 | Rao | G10L 15/063 704/243 |
| 2016/0300573 | A1* | 10/2016 | Carbune | G10L 15/193 |
| 2016/0379632 | A1* | 12/2016 | Hoffmeister | G10L 15/18 704/253 |
| 2017/0039196 | A1* | 2/2017 | Banerjee | G06F 16/9535 |
| 2017/0213551 | A1* | 7/2017 | Ji | B60W 50/10 |
| 2017/0270919 | A1* | 9/2017 | Parthasarathi | G10L 15/20 |
| 2018/0218732 | A1* | 8/2018 | Grant | G10L 15/22 |
| 2018/0261216 | A1* | 9/2018 | Leeb | G10L 15/1815 |
| 2018/0300335 | A1* | 10/2018 | Drochomirecki | G06F 16/9535 |

FOREIGN PATENT DOCUMENTS

| | | | | |
|---|---|---|---|---|
| CN | 105912521 | A * | 8/2016 | ............ G06F 17/27 |
| CN | 106445907 | A | 2/2017 | |
| CN | 106547738 | A | 3/2017 | |
| CN | 106598999 | A | 4/2017 | |

* cited by examiner

METHOD AND APPARATUS OF RECOGNIZING FIELD OF SEMANTIC PARSING INFORMATION, DEVICE AND READABLE MEDIUM

The present application claims the priority of Chinese Patent Application No. 2017103795771, filed on May 25, 2017, with the title of "Method and apparatus of recognizing field of semantic parsing information, device and readable medium". The disclosure of the above applications is incorporated herein by reference in its entirety.

FIELD OF THE DISCLOSURE

The present disclosure relates to the technical field of computer application, and particularly to a method and apparatus of recognizing a field of semantic parsing information, a device and a readable medium.

BACKGROUND OF THE DISCLOSURE

In the prior art, to better facilitate the user's use of an application App, many applications all support speech input. As such, the user only needs to input speech data to the App upon use, operations are simple and use is convenient.

Specifically, in the prior art, after the user inputs speech data to the App, the App needs to perform speech recognition for the speech data input by the user, then uses one or more patterns in each preset field to perform semantic parsing for a speech recognition result, and obtains semantic parsing information corresponding to the speech data in each preset field. That is to say, the semantic parsing information has the same semantics as the speech data so that the App directly analyzes the user's demands according to the sematic parsing information and thereby performs corresponding operations. For example, the user may use the speech data to request the application to invoke a certain application, or send a certain piece of verbal information, or query for a certain piece of information, or query and reserve a hotel room or book an airplane ticket, or the like.

However, in the prior art, when the semantic parsing information is parsed, at least one segment pattern of a certain preset field might be used. However, the segment pattern includes less information quantity and cannot accurately identify a corresponding field so that a reliability of the sematic parsing information belonging to the preset field is lower. In the prior art, since the reliability of the parsed sematic parsing information belonging to the preset field is not verified, the field to which the parsed semantic parsing information belongs is wrong, and the App performs operations irrelevant to the field of the speech data input by the user.

SUMMARY OF THE DISCLOSURE

The present disclosure provides a method and apparatus of recognizing a field of semantic parsing information, a device and a readable medium, to implement recognition of the field of the semantic parsing information.

The present disclosure provides a method of recognizing a field of semantic parsing information, the method comprising:

obtaining at least one preset keyword extracting pattern which is in a preset field and used to parse user-input speech data to generate semantic parsing information, each of the at least one preset keyword extracting pattern comprising at least one keyword;

obtaining subject weights of keywords according to importance degree identifiers of the keywords in the preset keyword extracting patterns in the preset field;

calculating a subject score of the speech parsing information according to the subject weights of the keywords;

recognizing whether the speech parsing information belongs to the preset field according to the subject score of the speech parsing information.

Further optionally, before obtaining at least one preset keyword extracting pattern which is in a preset field and used to parse user-input speech data to generate semantic parsing information, the method further comprises:

setting a plurality of preset keyword extracting patterns in each said preset field, each of the preset keyword extracting patterns comprising at least two keywords;

in the preset keyword extracting patterns of each said preset field, identifying importance degree identifiers of the keywords included in the corresponding preset keyword extracting patterns in the corresponding preset field.

Further optionally, in the method, before the step of, in the preset keyword extracting patterns of each said preset field, identifying importance degree identifiers of the keywords included in the corresponding preset keyword extracting patterns in the corresponding preset field, the method further comprises:

obtaining importance degree identifiers of the keywords included in the preset keyword extracting patterns in the corresponding preset field.

Further optionally, in the method, the obtaining importance degree identifiers of the keywords included in the preset keyword extracting patterns in the corresponding preset field specifically comprises:

collecting several linguistic data in each preset field and generating a corresponding corpus of the preset field;

performing word segmentation for linguistic data in the corpus, and extracting valid segmented words in the respective linguistic data as the keywords included by the linguistic data;

making statistics of a frequency of occurrence of the keyword in all keywords obtained after word segmentation is performed for several linguistic data in the corpus, as a word frequency of the corresponding keyword in the corpus;

setting an importance degree identifier in the preset field for a corresponding keyword according to a probability of the word frequency of the keyword in the corpus in an occurrence frequency of all the keywords obtained after word segmentation is performed for several linguistic data.

Further optionally, in the method, the obtaining subject weights of keywords according to importance degree identifiers of the keywords in the preset keyword extracting patterns in the preset field specifically comprises:

if the importance degree identifier of the keyword in the preset keyword extracting pattern in the preset field is high, obtaining a 0 subject weight corresponding to high, according to a correspondence relationship between the importance degree identifier and the subject weight;

if the importance degree identifier of the keyword in the preset keyword extracting pattern in the preset field is middle, obtaining a subject weight corresponding to middle as a first prime number according to the correspondence relationship between the importance degree identifier and the subject weight; or if the importance degree identifier of the keyword in the preset keyword extracting pattern in the preset field is low, obtaining a subject weight corresponding to low as a second prime number according to the correspondence relationship between the importance degree identifier and the subject weight; the second prime number is not equal to the first prime number; the importance degree of the keyword identified with high in the preset field is higher than that of the keyword identified with middle in the preset field; the importance degree of the keyword identified with middle in the preset field is higher than that of the keyword identified with low in the preset field.

Further optionally, in the method, the calculating a subject score of the speech parsing information according to the subject weights of the keywords specifically comprises:

multiplying subject weights of the keywords, to obtain the subject score of the speech parsing information.

Further optionally, in the method, the recognizing whether the speech parsing information belongs to the preset field according to the subject score of the speech parsing information specifically comprises:

if the subject score of the speech parsing information is 0, determining that the speech parsing information belongs to the preset field; or if the subject score of the speech parsing information minus a first parameter or a second parameter to get a remainder 0, determining that the speech parsing information includes the keyword with the middle importance degree identifier and that the number of the included keywords is larger than 1, and determining that the speech parsing information belongs to the preset field; wherein the first parameter is equal to a square of the first prime number, and the second parameter is equal to a product of the first prime number and the second prime number; or if the subject score of the speech parsing information is not equal to 0 and the remainder resulting from the subject score minus the first parameter or second parameter is not equal to 0, determining that the speech parsing information does not belong to the preset field.

The present disclosure provides an apparatus of recognizing a field of semantic parsing information, the apparatus comprising:

a pattern obtaining module configured to obtain at least one preset keyword extracting pattern which is in a preset field and used to parse user-input speech data to generate semantic parsing information, each of the at least one preset keyword extracting pattern comprising at least one keyword;

a subject weight obtaining module configured to obtain subject weights of keywords according to importance degree identifiers of the keywords in the preset keyword extracting patterns in the preset field;

a calculating module configured to calculate a subject score of the speech parsing information according to the subject weights of the keywords;

a recognizing module configured to recognize whether the speech parsing information belongs to the preset field according to the subject score of the speech parsing information.

Further optionally, in the apparatus, the apparatus further comprises:

a setting module configured to set a plurality of preset keyword extracting patterns in each said preset field, each preset keyword extracting pattern comprising at least two keywords;

an importance degree identifying module configured to, in the preset keyword extracting patterns of each said preset field, identify importance degree identifiers of the keywords included in the corresponding preset keyword extracting patterns in the corresponding preset field.

Further optionally, in the apparatus, the apparatus further comprises:

an importance degree identifier obtaining module configured to obtain importance degree identifiers of the keywords included in the preset keyword extracting patterns in the corresponding preset field.

Further optionally, in the apparatus, the importance degree identifier obtaining module is specifically configured to:

collect several linguistic data in each preset field and generate a corresponding corpus of the preset field;

perform word segmentation for linguistic data in the corpus, and extract valid segmented words in the respective linguistic data as the keywords included by the linguistic data;

make statistics of a frequency of occurrence of the keyword in all keywords obtained after word segmentation is performed for several linguistic data in the corpus, as a word frequency of the corresponding keyword in the corpus;

set an importance degree identifier in the preset field for a corresponding keyword according to a probability of the word frequency of the keyword in the corpus in an occurrence frequency of all the keywords obtained after word segmentation is performed for several linguistic data.

Further optionally, in the apparatus, the subject weight obtaining module is specifically configured to:

if the importance degree identifier of the keyword in the preset keyword extracting pattern in the preset field is high, obtain a 0 subject weight corresponding to high, according to a correspondence relationship between the importance degree identifier and the subject weight;

if the importance degree identifier of the keyword in the preset keyword extracting pattern in the preset field is middle, obtain a subject weight corresponding to middle as a first prime number according to the correspondence relationship between the importance degree identifier and the subject weight; or if the importance degree identifier of the keyword in the preset keyword extracting pattern in the preset field is low, obtain a subject weight corresponding to low as a second prime number according to the correspondence relationship between the importance degree identifier and the subject weight; the second prime number is not equal to the first prime number; the importance degree of the keyword identified with high in the preset field is higher than that of the keyword identified with middle in the preset field; the importance degree of the keyword identified with middle in the preset field is higher than that of the keyword identified with low in the preset field.

Further optionally, in the apparatus, the calculating module is specifically configured to:

multiply subject weights of the keywords, to obtain the subject score of the speech parsing information.

Further optionally, in the apparatus, the recognizing module is specifically configured to:

if the subject score of the speech parsing information is 0, determine that the speech parsing information belongs to the preset field; or if the subject score of the speech parsing information minus a first parameter or a second parameter to get a remainder 0, determine that the speech parsing information includes the keyword with the middle importance degree identifier and that the number of the included keywords is larger than 1, and determine that the speech parsing information belongs to the preset field; wherein the first parameter is equal to a square of the first prime number, and the second parameter is equal to a product of the first prime number and the second prime number; or if the subject score of the speech parsing information is not equal to 0 and the remainder resulting from the subject score minus the first parameter or second parameter is not equal to 0, determine that the speech parsing information does not belong to the preset field.

The present disclosure further provides a computer device, comprising:
one or more processors,
a memory for storing one or more programs,
the one or more programs, when executed by said one or more processors, enabling said one or more processors to implement the above-mentioned method of recognizing the field of the sematic parsing information.

The present disclosure further provides a computer readable medium on which a computer program is stored, the program, when executed by a processor, implementing the above-mentioned method of recognizing the field of the sematic parsing information.

According to the method and apparatus of recognizing the field of the sematic parsing information, the device and the readable medium of the present disclosure, at least one preset keyword extracting pattern which is in a preset field and used to parse user-input speech data to generate semantic parsing information is obtained, wherein each of the at least one preset keyword extracting pattern comprises at least one keyword; subject weights of keywords are obtained according to the importance degree identifiers of keywords in the keyword extracting patterns in the preset field; a subject score of speech parsing information is calculated according to the subject weights of the keywords; whether the speech parsing information belongs to the preset field is recognized according to the subject score of the speech parsing information. The technical solution of the present disclosure may be employed to recognize the field to which the speech parsing information belongs to thereby ensure correctness of the recognized field of the speech parsing information, and thereby ensure correctness of operations performed by the App according to the semantic parsing information.

DETAILED DESCRIPTION OF PREFERRED EMBODIMENTS

The present disclosure will be described in detail in conjunction with figures and specific embodiments to make objectives, technical solutions and advantages of the present disclosure more apparent.

Figure 1:
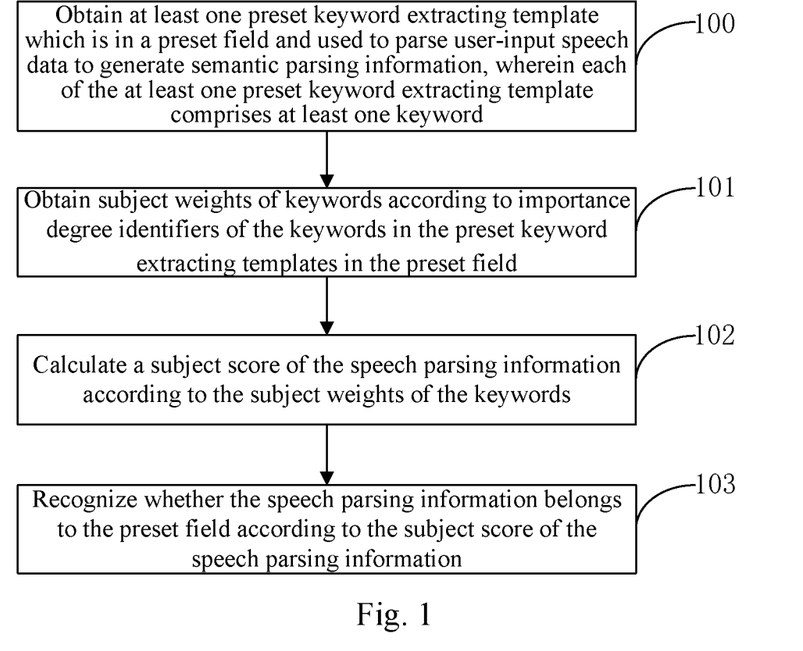
FIG. 1 is a flow chart of an embodiment of a method of recognizing a field of semantic parsing information according to the present disclosure.

FIG. 1 is a flow chart of an embodiment of a method of recognizing a field of semantic parsing information according to the present disclosure. As shown in FIG. 1, the method of recognizing a field of sematic parsing information according to the present embodiment may specifically include the following steps:

100: obtaining at least one preset keyword extracting pattern which is in a preset field and used to parse user-input speech data to generate semantic parsing information, wherein each of the at least one preset keyword extracting pattern comprises at least one keyword;

A subject of executing method of recognizing a field of semantic parsing information according to the present embodiment is an apparatus of recognizing a field of semantic parsing information. The apparatus of recognizing a field of semantic parsing information may be used in any application or platform capable of receiving the user's speech input.

When the method of recognizing a field of semantic parsing information of the present embodiment is used, the user-input speech data is received first, and then the user-input speech data is parsed to generate semantic parsing information. Specifically, it is necessary to first perform speech recognition for the user's speech data to obtain verbal information corresponding to the speech data, and then perform semantic parsing for the verbal information corresponding to the speech data to obtain the sematic parsing information. In practical application, the user-input speech data might belong to various different fields such as science and technology, education, recreation, hotel and train tickets. To perform correct semantic parsing for the speech data, it is feasible to preset keyword extracting patterns in a plurality of preset fields, and set a plurality of preset keyword extracting patterns in each preset field. In the present embodiment, when semantic parsing is performed, it is specifically feasible to employ one, two or more preset keyword extracting patterns in each preset field, extract one or more keywords from the verbal information corresponding to the speech data, and generate the sematic parsing information in a preset format. Finally, one semantic parsing information is generated in each preset field, but it cannot be ensured the sematic parsing information of each field is correct.

The keyword of the present embodiment may also be called a term, and the preset keyword extracting pattern may also be called a preset term extracting pattern. The preset term extracting pattern may include a slot of at least one term. When semantic parsing is performed, the type of the employed preset term extracting pattern may be a precise pattern or a segment pattern. In practical application, the precise pattern may include slots of a plurality of terms, the generated semantic parsing information is very accurate, and it is usually feasible to determine the field corresponding to the semantic parsing information, namely, a field to which the preset term extracting pattern corresponding to the precise pattern as the type used to generate the semantic parsing information, needless to perform field recognition any more. The segment pattern includes less information quantity, for example, the segment pattern may only include one piece of time information, price information or the like. If one, two or more segment patterns of the preset field are employed when the semantic parsing is performed, the field of the semantic parsing information obtained from the parsing at this time might not be accurate, whereupon the technical solution of the present embodiment needs to be employed to recognize the field of the sematic parsing information. For example, according to segment patterns in the field of hotels, if the sematic parsing information obtained by parsing with a segment pattern carrying time and a segment pattern carrying a price is "I spent 25 yuan yesterday afternoon", obviously the semantic parsing information should not belong to the field of hotels. Hence, in the present embodiment it is feasible to perform recognition for the field of the semantic parsing information in this case and then filter away semantic parsing information whose field is obviously wrong.

As known from the above analysis, in the present embodiment, the method of recognizing a field of semantic parsing information is mainly directed to the situation that upon semantic parsing, a segment pattern in a preset field is employed to generate semantic parsing information. If the solution of the present embodiment does not have any advantage with regard to the situation that a precise pattern in a preset field is employed to generate semantic parsing information upon semantic parsing, it is unnecessary to perform field recognition any more. Therefore, optionally, before step 100, the method further comprises: judging whether the type of the preset keyword extracting pattern used upon generating the semantic parsing information includes a segment pattern; if yes, using the method of the embodiment of the present disclosure to recognize the field of the semantic parsing information. Or, it is also feasible to obtain the number of preset keyword extracting patterns employed upon generating the semantic parsing information; then judge whether the number of the preset keyword extracting patterns is larger than 1. If the number of larger than 1, the precise pattern might not be employed, whereupon step 100 begins to be performed to perform recognition for the field of the semantic parsing information; if the number is equal to 1, it is further necessary to judge whether the preset keyword extracting pattern is the precise pattern or the segment pattern; if the preset keyword extracting pattern is the precise pattern, since the precise pattern is preset for the user according to the keyword of the preset field and can precisely represents the preset field, it is unnecessary to subsequently recognize the field of the semantic parsing information when the precise pattern is employed when the semantic parsing information is parsed. If the preset keyword extracting pattern is the segment pattern, step 100 begins to be performed to perform recognition with the method of recognizing a field of semantic parsing information of the present embodiment.

In addition, optionally, each preset keyword extracting pattern of each preset field of the present embodiment not only comprises at least one keyword but also may comprise an importance degree identifier of each keyword. Specifically, it is possible to identify the importance degree identifier of the keyword on each keyword in the preset keyword extracting pattern.

For example, optionally, before the step 100 "obtaining at least one preset keyword extracting pattern which is in a preset field and used to parse user-input speech data to generate semantic parsing information", the method may further comprise the following steps:

(a1) setting a plurality of preset keyword extracting patterns in each preset field, each preset keyword extracting pattern comprising at least two keywords;

For example, in the field of hotels, one preset keyword extracting pattern is set to include three keywords "reserve", "tomorrow" and "hotel"; another preset keyword extracting pattern is set to include keywords "reserve", "holiday" and "hotel"; a further preset keyword extracting pattern is set to include keywords "hotel", "check-in" and "handle" and the like.

The plurality of preset keyword extracting patterns of each preset field of the present embodiment may be manually set by the user according to a speech data input habit in the preset field. For example, the apparatus of recognizing a field of semantic parsing information may receive the preset keyword extracting patterns in each preset field input by the user through a man-machine interface pattern. The man-machine interface pattern may include a mouse and/or a keyboard, or may be a touch screen detecting device. The touch screen detecting device detects and receives the user-input preset keyword extracting patterns in each preset field, and stores them in the apparatus of recognizing a field of semantic parsing information.

(a2) in the preset keyword extracting patterns of each preset field, identifying importance degree identifiers of keywords included in the corresponding preset keyword extracting patterns in the corresponding preset field.

That is to say, in the preset keyword extracting patterns are identified an importance degree identifier of each keyword in the preset field to which the preset keyword extracting pattern belongs.

For example, before step (a2), the method may further comprise the following step: obtaining importance degree identifiers of keywords included in the preset keyword extracting patterns in the corresponding preset field.

Furthermore, "obtaining importance degree identifiers of keywords included in the preset keyword extracting patterns in the corresponding preset field" may specifically comprise the following steps:

(b1) collecting several linguistic data in each preset field and generating a corresponding corpus of the preset field;

Several linguistic data in each preset field may be collected, and each linguistic data may be semantic parsing information corresponding to the user-input speech data in the preset field. In each preset field, the corpus of the preset field may be generated by collecting several linguistic data.

(b2) performing word segmentation for linguistic data in the corpus, and extracting valid segmented words in the respective linguistic data as keywords included by the linguistic data;

Word segmentation is performed for each linguistic data to obtain a plurality of segmented words, and then meaningless segmented words, for example person words such as "you", "I", "you" and "we" and words such as "的(de)", "地(di)", "啊(a)", "你(ni)" and "吗(ma)" without practical meaning, may be removed, and only the remaining valid words are retained as keywords of the linguistic data (b3) making statistics of a frequency of occurrence of each keyword in all keywords obtained after word segmentation is performed for several linguistic detain the corpus, as a word frequency of the corresponding keyword in the corpus;

It is feasible to, in this manner, obtain keywords included in each linguistic data in the corpus, and then make statistics of a frequency of occurrence of all keywords obtained after word segmentation is performed for all linguistic data in the corpus and a word frequency of each keyword in the corpus.

(b4) setting an importance degree identifier in a preset field for a corresponding keyword according to a probability of the word frequency of each keyword in the corpus in an occurrence frequency of all keywords obtained after word segmentation is performed for several linguistic data.

For example, it is feasible to divide the word frequency of each keyword in the corpus by the occurrence frequency of all keywords obtained after word segmentation is performed for several linguistic data, to obtain the probability of occurrence of the keyword in the linguistic data in the corpus. For example, if the word frequency of a certain keyword in the corpus is 100 times, and the occurrence frequency of all keywords obtained after word segmentation is performed for several linguistic data in the corpus is 2000 times, the probability of occurrence of the keyword in the linguistic data in the corpus is equal to 100/2000=1/20=0.05. The probability of occurrence of each keyword in the linguistic data in the corpus may be obtained in this manner. Then, the importance degree identifier in the preset field is set for the corresponding keyword according to the probability of occurrence of each keyword in the linguistic data in the corpus. A keyword with a corresponding large probability may be set as having an important importance degree identifier in the preset field; a keyword with a small probability may be set as having an unimportant importance degree identifier in the preset field. For example, the importance degrees may be classified into three classes: a keyword with a probability larger than or equal to a first preset threshold is set as having a high importance degree identifier in the preset field; a keyword with a probability larger than or equal to a second preset threshold and smaller than the first preset threshold is set as having a middle importance degree identifier in the preset field; a keyword with a probability smaller than the second preset threshold is set as having a low importance degree identifier in the preset field. Alternatively, it is also feasible to only set two importance degree identifiers among the high, middle and low importance degree identifiers. The importance degree identifier which is not set is considered as the third importance degree identifier by default. For example, only high and middle importance degree identifiers are set for keywords, and other keywords are considered as having a low importance degree identifier by default.

Alternatively, in the present embodiment, it is also possible to directly employ the probability of occurrence of the keyword in the linguistic data in the corpus, as the importance degree identifier of the keyword in the preset field. A larger probability indicates a higher importance degree of the keyword in the preset field.

Finally, in the preset keyword extracting patterns in the preset fields are identified importance degree identifiers of keywords included in the corresponding preset keyword extracting patterns in the corresponding preset fields.

101: obtaining subject weights of keyword according to the importance degree identifiers of keywords in the keyword extracting patterns in the preset field;

As known from the manner of the above embodiment, in the keyword extracting patterns in the preset fields are identified importance degree identifiers of keywords included in the preset keyword extracting patterns in the preset fields. As such, after at least one preset keyword extracting pattern which is in a preset field and used to parse user-input speech data to generate semantic parsing information is obtained in step 100, the importance degree identifiers of keywords in the keyword extracting patterns in the preset field may be obtained from the obtained keyword extracting patterns. Then, the subject weights of keywords are obtained according to the importance degree identifiers of keywords in the preset field.

102: calculating a subject score of speech parsing information according to the subject weights of the keywords;

103: recognizing whether the speech parsing information belongs to the preset field according to the subject score of the speech parsing information.

For example, if the importance degree identifiers of keywords in the keyword extracting patterns in the preset field are classified into three levels: high, middle and low, correspondingly a correspondence relationship between each level of importance degree identifier and a corresponding subject weight may be pre-stored in the apparatus of recognizing the field of the semantic parsing information. At this time, step 101 "obtaining subject weights of keyword according to the importance degree identifiers of keywords in the keyword extracting patterns in the preset field" may specifically include the following cases:

(c1) if the importance degree identifier of a keyword in the preset keyword extracting pattern in the preset field is high, obtaining a 0 subject weight corresponding to high, according to the correspondence relationship between the importance degree identifier in the preset field and the subject weight;

(c2) if the importance degree identifier of a keyword in the preset keyword extracting pattern in the preset field is middle, obtaining a subject weight corresponding to middle as a first prime number, for example 2, according to the correspondence relationship between the importance degree identifier in the preset field and the subject weight. In the present embodiment, according to the property of the prime number having two common divisors, namely, 1 and itself, the prime number is used a weight to facilitate subsequently recognizing whether the speech parsing information belongs to the preset field according to the subject score of the speech parsing information.

(c3) if the importance degree identifier of a keyword in the preset keyword extracting pattern in the preset field is low, obtaining a subject weight corresponding to low as a second prime number which is not equal to the first prime number; for example, the second prime number may be 3.

The importance degree of the keyword identified with high in the preset field is higher than that of the keyword identified with middle in the preset field; the importance degree of the keyword identified with middle in the preset field is higher than that of the keyword identified with low in the preset field.

Further optionally, at this time, the step 102 "calculating a subject score of speech parsing information according to the subject weights of the keywords" may specifically comprise: multiplying subject weights of keywords, to obtain the subject score of the speech parsing information. For example, the score may be represented by the following formula:

$$score=w(term1)*w(term2)* \ldots *w(termN)$$

wherein score represents a subject score of the speech parsing information; w(term1) represents the first term of the current preset keyword extracting pattern, namely, a subject weight of the first keyword; w(term2) represents the second term of the current preset keyword extracting pattern, namely, a subject weight of the first keyword; w (termN) represents the $N^{th}$ term of the current preset keyword extracting pattern, namely, a subject weight of the first keyword. In the present embodiment, N terms are taken as an example.

Further optionally, at this time, step 103 "recognizing whether the speech parsing information belongs to the preset field according to the subject score of the speech parsing information" may specifically include the following cases:

(d1) if the subject score of the speech parsing information is 0, determining that the speech parsing information belongs to the preset field;

The subject score of the speech parsing information of the present embodiment is obtained by multiplying subject weights of keywords, and the subject weight of the keyword with a high importance degree identifier is 0. That is to say, if the preset keyword extracting pattern only includes a subject weight with a high importance degree identifier, the subject score of the speech parsing information is 0. Hence, if the subject score of the speech parsing information is 0, it may be determined that the speech parsing information belongs to the preset field.

(d2) if the subject score of the speech parsing information minus a first parameter or a second parameter to get a remainder 0, determining that the speech parsing information includes a keyword with a middle importance degree identifier and that the number of the included keywords is larger than 1, and determining that the speech parsing information belongs to the preset field; wherein the first parameter is equal to a square of the first prime number, and the second parameter is equal to a product of the first prime number and the second prime number.

The first prime number and second prime number in the above embodiment only include two common divisors, namely, itself and 1. At this time, the first prime number is multiplied with the first prime number to obtain the first parameter, namely, the first parameter is equal to the square of the first prime number. The first prime number is multiplied with the second prime number to obtain the second parameter. Then, if the subject score of the speech parsing information minus the first parameter to get a remainder 0, this indicates that the subject score includes the first parameter obtained by multiplying the first prime number with the first prime number, and indicates that the preset keyword extracting pattern at least includes two keywords with the middle importance degree identifier; if the subject score of the speech parsing information minus the second parameter to get a remainder 0, this indicates that the subject score includes the second parameter obtained by multiplying the first prime number with the second prime number, and indicates that the preset keyword extracting pattern at least includes a keywords with the middle importance degree identifier and a keyword with the low importance degree identifier. That is, it may be determined that the speech parsing information includes the keyword with the middle importance degree identifier, and the number of the included keywords is larger than 1, and it may be determined that the speech parsing information belongs to the preset field.

(d3) if the subject score of the speech parsing information is not equal to 0 and the remainder resulting from the subject score minus the first parameter or second parameter is not equal to 0, determining that the speech parsing information does not belong to the preset field.

If the subject score of the speech parsing information does not satisfy the above cases (c1) and (c2), namely, at this time, the subject score of the speech parsing information is not equal to 0 and the remainder resulting from the subject score minus the first parameter or second parameter is not equal to 0, it is determined that the speech parsing information does not belong to the preset field.

In addition, if the importance degree identifiers of keywords in the keyword extracting pattern in the preset field are represented directly with the probability of occurrence of keywords in the linguistic data in the corpus, it is feasible to, at this time, set a corresponding weight according to a magnitude of the probability of occurrence of the keywords in the linguistic data in the corpus. For example, the weight set at this time may be in a direct proportion to the probability. A larger probability may be provided with a larger weight. For example, it is feasible to, in a similar manner, classify probabilities into 10 levels, and set corresponding weights respectively as 10 positive integers in a range of 1-10. The level with a minimum probability is provided with a smaller weight 1, a level with a maximum probability is provided with a maximum weight 10, and other levels are provided with a weight in a similar way. Alternatively, it is also possible to directly consider values of probability of occurrence of keywords in the linguistic data in the corpus as subject weights of the corresponding keywords.

At this time, the subject score of the speech parsing information is calculated according to the subject weights of keywords. The subject score of the speech parsing information may be obtained by adding up the subject weights of keywords in the keyword extracting pattern. For example, the formula employed at this time may be represented as score=w(term1)+w (term2)+ . . . +w (temrN). At this time, specifically, reference may be made to a preset threshold to recognize whether the speech parsing information belongs to the preset field according to the subject score of the speech parsing information. If the subject score of the speech parsing information is larger than or equal to a preset threshold, this indicates that at this time the speech parsing information belongs to the preset field corresponding to the keyword extracting pattern. If the subject score of the speech parsing information is smaller than a preset threshold, this indicates that at this time the speech parsing information does not belong to the preset field corresponding to the keyword extracting pattern.

According to the method of recognizing the field of semantic parsing information of the present embodiment, at least one preset keyword extracting pattern which is in a preset field and used to parse user-input speech data to generate semantic parsing information is obtained, wherein each of the at least one preset keyword extracting pattern comprises at least one keyword; subject weights of keywords are obtained according to the importance degree identifiers of keywords in the keyword extracting patterns in the preset field; a subject score of speech parsing information is calculated according to the subject weights of the keywords; whether the speech parsing information belongs to the preset field is recognized according to the subject score of the speech parsing information. The technical solution of the present embodiment may be employed to recognize the field to which the speech parsing information belongs to thereby ensure correctness of the recognized field of the speech parsing information, and thereby ensure correctness of operations performed by the App according to the semantic parsing information.

In conjunction with the characteristics of semantic parsing tasks, the method of recognizing the field of semantic parsing information of the present embodiment mainly employs an idea of considering term subject weights, and the method achieves a very good false rejection effect after being tested on multiple fields of a universal semantic parsing platform; the method has a good field transplantation performance and facilitates optimization for application to a specific field. Furthermore, the method of recognizing the field of semantic parsing information of the present embodiment brings about a better parsing effect, and can implement evaluation of reliability of a parsing result when the semantic parsing information is applied in multiple vertical fields; furthermore, the test result indicates introduction of this method causes obviously positive benefits to the parsing results.

Figure 2:
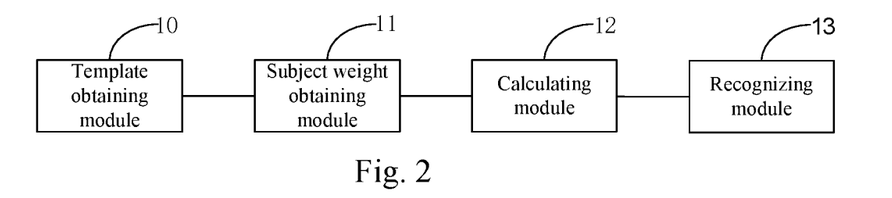
FIG. 2 is a structural diagram of a first embodiment of an apparatus of recognizing a field of semantic parsing information according to the present disclosure.

FIG. 2 is a structural diagram of a first embodiment of an apparatus of recognizing a field of semantic parsing information according to the present disclosure. As shown in FIG. 2, the apparatus of recognizing the field of semantic parsing information of the present embodiment may specifically include: a pattern obtaining module 10, a subject weight obtaining module 11, a calculating module 12 and a recognizing module 13.

The pattern obtaining module 10 is configured to obtain at least one preset keyword extracting pattern which is in a preset field and used to parse user-input speech data to generate semantic parsing information, wherein each of the at least one preset keyword extracting pattern comprises at least one keyword;

the subject weight obtaining module 11 is configured to obtain subject weights of keywords according to importance degree identifiers of keywords in the preset keyword extracting patterns obtained by the pattern obtaining module 10 in the preset field;

the calculating module 12 is configured to calculate a subject score of speech parsing information according to the subject weights of the keywords obtained by the subject weight obtaining module 11;

the recognizing module 13 is configured to recognize whether the speech parsing information belongs to the preset field according to the subject score of the speech parsing information calculated by the calculating module 12.

Principles employed by the apparatus of recognizing the field of the semantic parsing information of the present embodiment to implement information processing with the above modules and the resultant technical effects are the same as those of the above-mentioned method embodiments. For particulars, please refer to the depictions of the aforesaid relevant method embodiments, and no detailed depictions will be presented here.

Figure 3:
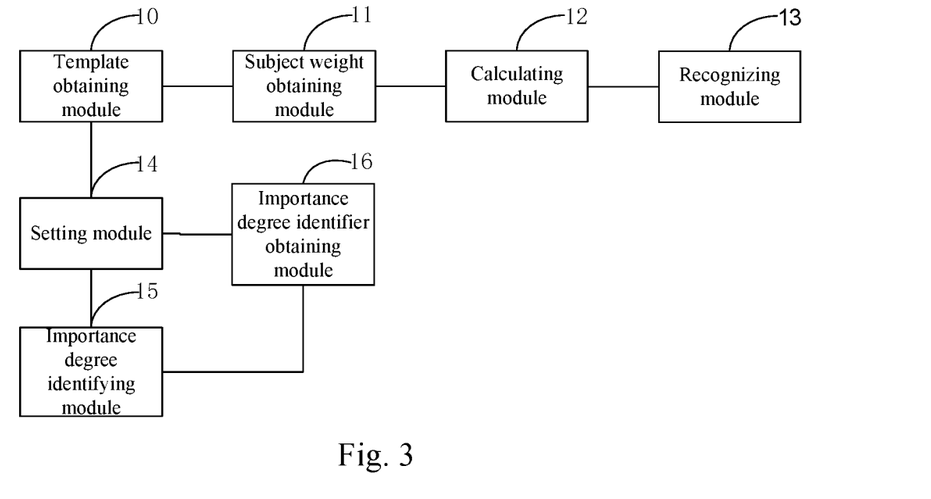
FIG. 3 is a structural diagram of a second embodiment of an apparatus of recognizing a field of semantic parsing information according to the present disclosure.

FIG. 3 is a structural diagram of a second embodiment of an apparatus of recognizing a field of semantic parsing information according to the present disclosure. As shown in FIG. 3, the apparatus of recognizing the field of the semantic parsing information of the present embodiment, on the basis of the technical solution of the embodiment shown in FIG. 2, further introduces the technical solution of the present disclosure in more detail. As shown in FIG. 3, the apparatus of recognizing the field of the semantic parsing information according to the present embodiment further comprises:

a setting module 14 configured to set a plurality of preset keyword extracting patterns in each preset field, each preset keyword extracting pattern comprising at least two keywords;

an importance degree identifying module 15 configured to, in the preset keyword extracting patterns of each preset field set by the setting module 14, identify importance degree identifiers of keywords included in the corresponding preset keyword extracting patterns in the corresponding preset field.

At this time, correspondingly, the pattern obtaining module 10 is configured to obtain, from the multiple preset keyword extracting patterns of each preset field set by the setting module 14, the preset keyword extracting patterns of the preset field, matched with the semantic parsing information of the user-input speech data.

Further optionally, as shown in FIG. 3, the apparatus of recognizing the field of semantic parsing information of the present embodiment further comprises:

an importance degree identifier obtaining module 16 configured to obtain importance degree identifiers of keywords included in the preset keyword extracting patterns set by the setting module 14 in the corresponding preset field.

For example, the importance degree identifier obtaining module 16 is specifically configured to:

collect several linguistic data in each preset field and generate a corresponding corpus of the preset field;

perform word segmentation for linguistic data in the corpus, and extract valid segmented words in the respective linguistic data as keywords included by the linguistic data;

make statistics of a frequency of occurrence of each keyword in all keywords obtained after word segmentation is performed for several linguistic data in the corpus, as a word frequency of the corresponding keyword in the corpus;

set an importance degree identifier in a preset field for a corresponding keyword according to a probability of the word frequency of each keyword in the corpus in an occurrence frequency of all keywords obtained after word segmentation is performed for several linguistic data.

Then, correspondingly, the importance degree identifying module 15 is configured to use the importance degree identifiers of the keywords in the preset field obtained by the importance degree identifier obtaining module 16 to, in the preset keyword extracting patterns of each preset field set by the setting module 14, identify importance degree identifiers of keywords included in the corresponding preset keyword extracting patterns in the corresponding preset field.

Further optionally, in the apparatus of recognizing the field of semantic parsing information of the present embodiment, the subject weight obtaining module 11 is specifically configured to:

if the importance degree identifier of a keyword in the preset keyword extracting pattern obtained by the pattern obtaining module 10 in the preset field is high, obtain a 0 subject weight corresponding to high, according to a correspondence relationship between the importance degree identifier and the subject weight;

if the importance degree identifier of the keyword in the preset keyword extracting pattern obtained by the pattern obtaining module 10 in the preset field is middle, obtain a subject weight corresponding to middle as a first prime number according to the correspondence relationship between the importance degree identifier and the subject weight; or if the importance degree identifier of the keyword in the preset keyword extracting pattern obtained by the pattern obtaining module 10 in the preset field is low, obtain a subject weight corresponding to low as a second prime number according to the correspondence relationship between the importance degree identifier and the subject weight; the second prime number is not equal to the first prime number; the importance degree of the keyword identified with high in the preset field is higher than that of the keyword identified with middle in the preset field; the importance degree of the keyword identified with middle in the preset field is higher than that of the keyword identified with low in the preset field.

Further optionally, in the apparatus of recognizing the field of semantic parsing information of the present embodiment, the calculating module 12 is specifically configured to:

multiply subject weights of keywords obtained by the subject weight extracting pattern 11, to obtain the subject score of the speech parsing information.

Further optionally, in the apparatus of recognizing the field of semantic parsing information of the present embodiment, the recognizing module 13 is specifically configured to:

if the subject score of the speech parsing information calculated by the calculating module 12 is 0, determine that the speech parsing information belongs to the preset field; or if the subject score of the speech parsing information calculated by the calculating module 12 minus a first parameter or a second parameter to get a remainder 0, determine that the speech parsing information includes a keyword with a middle importance degree identifier and that the number of the included keywords is larger than 1, and determine that the speech parsing information belongs to the preset field; wherein the first parameter is equal to a square of the first prime number, and the second parameter is equal to a product of the first prime number and the second prime number; or if the subject score of the speech parsing information calculated by the calculating module 12 is not equal to 0 and the remainder resulting from the subject score minus the first parameter or second parameter is not equal to 0, determine that the speech parsing information does not belong to the preset field.

Principles employed by the apparatus of recognizing the field of the semantic parsing information of the present embodiment to implement information processing with the above modules and the resultant technical effects are the same as those of the above-mentioned method embodiments. For particulars, please refer to the depictions of the aforesaid relevant method embodiments, and no detailed depictions will be presented here.

Figure 4:
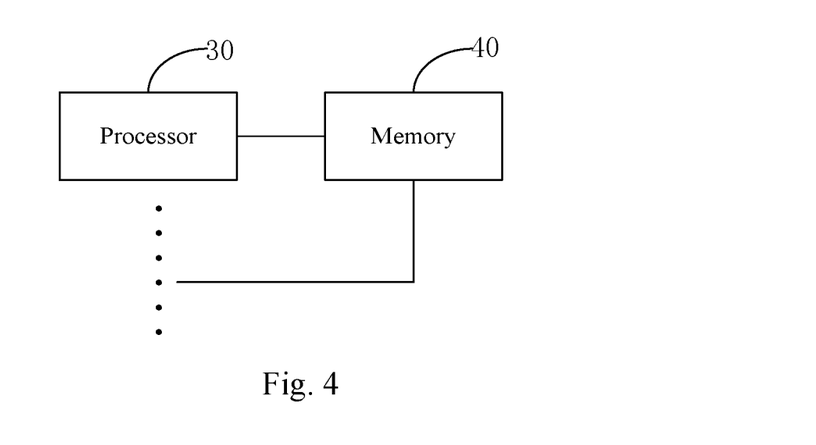
FIG. 4 is a structural diagram of an embodiment of a computer device according to the present disclosure.

FIG. 4 is a structural diagram of an embodiment of a computer device according to the present disclosure. As shown in FIG. 4, the computer device according to the present embodiment comprises: one or more processors 30, and a memory 40 for storing one or more programs, the one or more programs stored in the memory 40, when executed by said one or more processors 30, enabling said one or more processors 30 to implement the method of recognizing the field of the semantic parsing information of the embodiments as shown in FIG. 1-FIG. 3. The embodiment shown in FIG. 4 exemplarily includes a plurality of processors 30.

Figure 5:
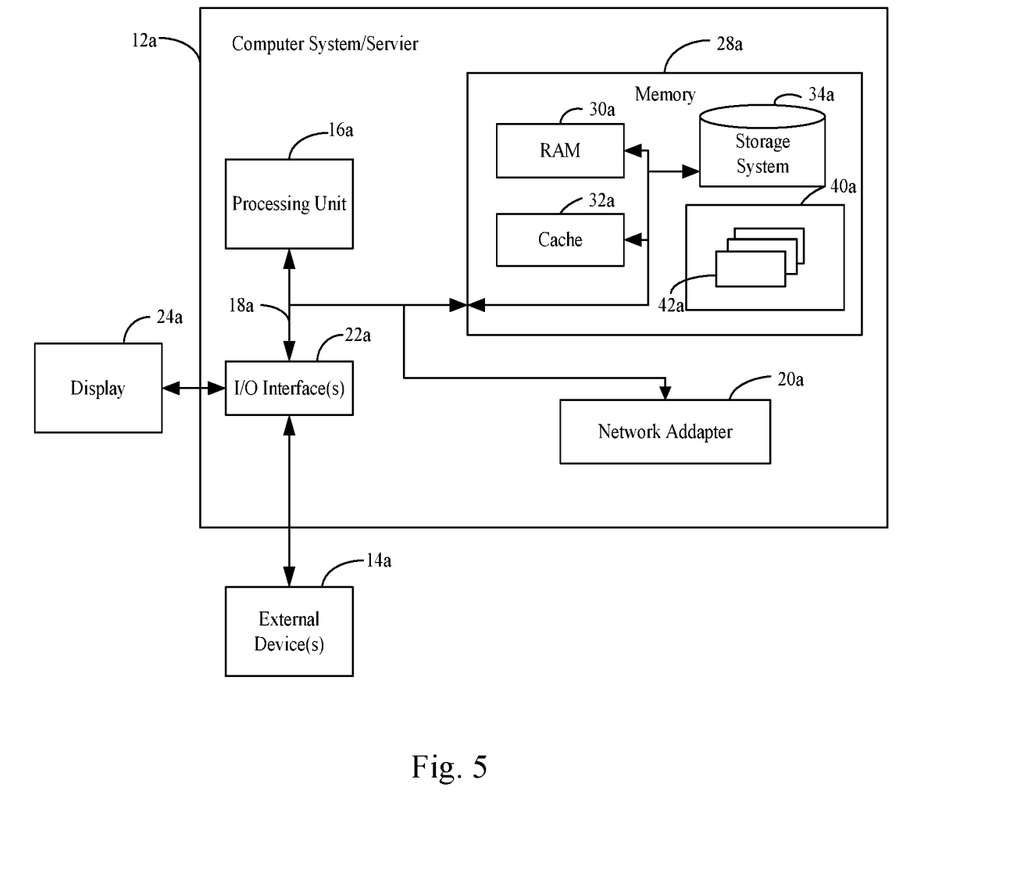
FIG. 5 is an example diagram of a computer device according to the present disclosure.

For example, FIG. 5 is an example diagram of a computer device according to the present disclosure. FIG. 5 shows a block diagram of an example computer device 12a adapted to implement an implementation mode of the present disclosure. The computer device 12a shown in FIG. 5 is only an example and should not bring about any limitation to the function and scope of use of the embodiments of the present disclosure.

As shown in FIG. 5, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 3 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 3 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 5, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the method of recognizing the field of semantic parsing information shown in the above embodiments.

The present disclosure further provides a computer readable medium on which a computer program is stored, the program, when executed by a processor, implementing the method of recognizing the field of semantic parsing information shown in the above embodiments.

The computer readable medium of the present embodiment may include RAM 30a, and/or cache memory 32a and/or a storage system 34a in the system memory 28a in the embodiment shown in FIG. 5.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method of recognizing a field of semantic parsing information, wherein the method comprises:

obtaining at least one preset keyword extracting template which is in a preset field and used to parse user-input speech data to generate semantic parsing information, each of the at least one preset keyword extracting template comprising at least one keyword;

obtaining a subject weight of each of the at least one keyword according to an importance degree identifier of the keyword in the preset keyword extracting template in the preset field; wherein the subject weight of a keyword, whose importance degree identifier is high, is identified with 0, the subject weight of a keyword, whose importance degree identifier is middle, is identified with a first prime number, and the subject weight of a keyword, whose importance degree identifier is low, is identified with a second prime number different from the first prime number; and wherein the importance degree of the keyword identified with high in the preset field is higher than that of the keyword identified with middle in the preset field, and the importance degree of the keyword identified with middle in the preset field is higher than that of the keyword identified with low in the preset field;

calculating a subject score of the semantic parsing information by multiplying the subject weight of each of at least two keywords in case that there are at lest two keywords, and taking the subject weight of one keyword as the subject score of the semantic paring information in case that there is the one keyword;

determining that the semantic parsing information, whose subject score is 0, belongs to the preset field; the first parameter is equal to a square of the first prime number, and the second parameter is determining that the semantic parsing information, whose subject score minus a first parameter or a second parameter to get a remainder 0, belongs to the preset field, wherein the first parameter is equal to a square of the first prime number, and the second parameter is equal to a product of the first prime number and the second prime number; and determining that the semantic parsing information, whose subject score is not equal to 0 and the remainder resulting from the subject score minus the first parameter or second parameter is not equal to 0, does not belong to the preset field.

2. The method according to claim 1, wherein before obtaining at least one preset keyword extracting template which is in a preset field and used to parse user-input speech data to generate semantic parsing information, the method further comprises:

setting a plurality of preset keyword extracting templates in each said preset field, each of the preset keyword extracting templates comprising at least two keywords; and in the preset keyword extracting templates of each said preset field, identifying importance degree identifiers of the keywords included in the preset keyword extracting templates in the preset field.

3. The method according to claim 2, wherein before obtaining the subject weight of each of the at least one keyword according to the importance degree identifier of the keyword in the preset keyword extracting template in the preset field, the method further comprises:

obtaining the importance degree identifier of each keyword included in the preset keyword extracting templates in the preset field.

4. The method according to claim 3, wherein obtaining the importance degree identifier of each keyword included in the preset keyword extracting template in the preset field specifically comprises:

collecting linguistic data in the each preset field and generating a corpus of the preset field;

performing word segmentation for linguistic data in the corpus, and extracting valid segmented words in the linguistic data as the keywords included by the linguistic data;

making statistics of a frequency of occurrence of a keyword in all keywords obtained after word segmentation is performed for the linguistic data in the corpus, as a word frequency of the keyword in the corpus; and setting an importance degree identifier in the preset field for the keyword according to a probability of the word frequency of the keyword in the corpus in an occurrence frequency of all the keywords obtained after word segmentation is performed for the linguistic data.

5. A computer device, wherein the device comprises:
one or more processors,
a memory for storing one or more programs,
the one or more programs, when executed by said one or more processors, enabling said one or more processors to implement the following operation:

obtaining at least one preset keyword extracting template which is in a preset field and used to parse user-input speech data to generate semantic parsing information, each of the at least one preset keyword extracting template comprising at least one keyword;

obtaining a subject weight of each of the at least one keyword according to an importance degree identifier of the keyword in the preset keyword extracting template in the preset field; wherein the subject weight of a keyword, whose importance degree identifier is high, is identified with 0, the subject weight of a keyword, whose importance degree identifier is middle, is identified with a first prime number, and the subject weight of a keyword, whose importance degree identifier is low. is identified with a second prime number different from the first prime number, and wherein the importance degree of the keyword identified with high in the preset field is higher than that of the keyword identified with middle in the preset field; and the importance degree of the keyword identified with middle in the preset field is higher than that of the keyword identified with low in the preset field;

calculating a subject score of the semantic parsing information by multiplying the subject weight of each of at least two keywords in case that there are at least two keywords, and taking the subject weight of one keyword as the subject score of the semantic paring information in case that there is the one keyword;

determining that the semantic parsing information, whose subject score is 0, belongs to the preset field, determining that the semantic parsing information, whose subject score minus a first parameter or a second parameter to get a remainder 0, belongs to the preset field, wherein the first parameter is equal to a square of the first prime number, and the second parameter is equal to a product of the first prime number and the second prime number, and determining that the semantic parsing information, whose subject score is not equal to 0 and the remainder resulting from the subject score minus the first parameter or second parameter is not equal to 0, does not belong to the preset field.

6. The computer device according to claim 5, wherein before obtaining at least one preset keyword extracting template which is in a preset field and used to parse user-input speech data to generate semantic parsing information, the operation further comprises:

setting a plurality of preset keyword extracting templates in each said preset field, each of the preset keyword extracting templates comprising at least two keywords; and in the preset keyword extracting templates of each said preset field, identifying importance degree identifiers of the keywords included in the preset keyword extracting templates in the preset field.

7. The computer device according to claim 6, wherein before obtaining the subject weight of each of the at least one keyword according to the importance degree identifier of the keyword in the preset keyword extracting, template in the preset field, the operation further comprises:

obtaining the importance degree identifiers of each included in the preset keyword extracting templates in the preset field.

8. The computer device according to claim 7, wherein obtaining the importance degree identifier of each keyword included in the preset keyword extracting template in the preset field specifically comprises:

collecting linguistic data in the each preset field and generating a corpus of the preset field;

performing word segmentation for linguistic data in the corpus, and extracting valid segmented words in the linguistic data as the keywords included by the linguistic data;

making statistics of a frequency of occurrence of a keyword in all keywords obtained after word segmentation is performed for the linguistic data in the corpus, as a word frequency of the keyword in the corpus; and setting an importance degree identifier in the preset field for the keyword according to a probability of the word frequency of the keyword in the corpus in an occurrence frequency of all the keywords obtained after word segmentation is performed for the linguistic data.

9. A non-transitory computer readable medium on which a computer program is stored, wherein the program, when executed by a processor, implements the following operation:
- obtaining at least one preset keyword extracting template which is in a preset field and used to parse user-input speech data to generate semantic parsing information, each of the at least one preset keyword extracting template comprising at least one keyword;
- obtaining a subject weight of each of the at least one keyword according to an importance degree identifier of the keyword in the preset keyword extracting template in the preset field; wherein the subject weight of a keyword, whose importance degree identifier is high, is identified with 0, the subject weight of a keyword, whose importance degree identifier is middle is identified with a first middle number, and the subject weight of a keyword, whose importance degree identifier is low, is identified with a second prime number different from the first prime number; and wherein the importance degree of the keyword identified with high in the preset field is higher than that of the keyword identified with middle in the preset field; and the importance degree of the keyword identified with middle in the preset field is higher than that of the keyword identified with low in the preset field;
- calculating a subject score of the semantic parsing information by multiplying the subject weight of each of at least two keywords in case that there are at least two keywords, and taking the subject weight of one keyword as the subject score of the semantic paring information in case that there is the one keyword;
- determining that the semantic parsing information, whose subject score is 0, belongs to the preset field;
- determining that the semantic parsing information, whose subject score minus a first parameter or a second parameter to get a remainder 0, belongs to the preset field, wherein the first parameter is equal to a square of the first prime number, and the second parameter is equal to a product of the first prime number and the second prime number; and
- determining that the semantic parsing information, whose subject score is not equal to 0 and the remainder resulting from the subject score minus the first parameter or second parameter is not equal to 0, does not belong to the preset field.

10. The non-transitory computer readable medium according to claim 9, wherein before obtaining at least one preset keyword extracting template which is in a preset field and used to parse user-input speech data to generate semantic parsing information, the operation further comprises:
- setting a plurality of preset keyword extracting templates in each said preset field, each of the preset keyword extracting templates comprising at least two keywords; and
- in the preset keyword extracting templates of each said preset field, identifying importance degree identifiers of the keywords included in the preset keyword extracting templates in the preset field.

11. The non-transitory computer readable medium according to claim 10, wherein before obtaining the subject weight of each of the at least one keyword according to the importance degree identifier of the keyword in the preset keyword extracting template in the preset field, the operation further comprises:
- obtaining the importance degree identifier of each keyword included in the preset keyword extracting templates in the preset field.

12. The non-transitory computer readable medium according to claim 11, wherein obtaining the importance degree identifier of each keyword included in the preset keyword extracting templates in the preset field specifically comprises:
- collecting linguistic data in the each preset field and generating a corpus of the preset field;
- performing word segmentation for linguistic data in the corpus, and extracting valid segmented words in the linguistic data as the keywords included by the linguistic data;
- making statistics of a frequency of occurrence of a keyword in all keywords obtained after word segmentation is performed for the linguistic data in the corpus, as a word frequency of the keyword in the corpus; and
- setting an importance degree identifier in the preset field for the keyword according to a probability of the word frequency of the keyword in the corpus in an occurrence frequency of all the keywords obtained after word segmentation is performed for the linguistic data.

* * * * *

UNITED STATES PATENT AND TRADEMARK OFFICE
CERTIFICATE OF CORRECTION

PATENT NO. : 10,777,192 B2  
APPLICATION NO. : 15/980233  
DATED : September 15, 2020  
INVENTOR(S) : Qin Qu et al.

Page 1 of 1

It is certified that error appears in the above-identified patent and that said Letters Patent is hereby corrected as shown below:

In the Claims

Column 18, Line 51, Claim 1:  
After "in case that there are at"  
Delete "lest" and  
Insert -- least --

Column 18, Lines 56-58, Claim 1:  
After "belongs to the preset field"  
Delete "the first parameter is equal to a square of the first prime number, and the second parameter is"

Column 20, Lines 45-46, Claim 7:  
After "obtaining the importance degree identifiers of each"  
Insert -- keyword --

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*